United States Patent
Shigyo et al.

(10) Patent No.: US 8,460,603 B2
(45) Date of Patent: Jun. 11, 2013

(54) METHOD OF MANUFACTURING ELECTRICAL DISCHARGE SURFACE TREATMENT-PURPOSE ELECTRODE AND ELECTRICAL DISCHARGE SURFACE TREATMENT-PURPOSE ELECTRODE

(75) Inventors: Kazuhiro Shigyo, Chiyoda-ku (JP); Yoshikazu Nakano, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 700 days.

(21) Appl. No.: 12/422,421

(22) Filed: Apr. 13, 2009

(65) Prior Publication Data
US 2009/0288809 A1    Nov. 26, 2009

(30) Foreign Application Priority Data
May 20, 2008   (JP) ................................ 2008-132026

(51) Int. Cl.
*B22F 3/02*   (2006.01)
(52) U.S. Cl.
USPC ............. 419/66; 165/133; 29/875; 29/885; 416/241 R; 419/13; 419/30; 419/35; 419/38
(58) Field of Classification Search
USPC .......................................................... 419/66
See application file for complete search history.

(56) References Cited

U.S. PATENT DOCUMENTS

| | | | | |
|---|---|---|---|---|
| 5,147,448 | A | * | 9/1992 | Roberts et al. ................... 75/331 |
| 5,372,629 | A | * | 12/1994 | Anderson et al. ................ 75/332 |
| 2006/0081462 | A1 | * | 4/2006 | Goto et al. ....................... 204/280 |

FOREIGN PATENT DOCUMENTS

| | | |
|---|---|---|
| JP | 58-204102 | 11/1983 |
| JP | 63-20032 | 1/1988 |
| JP | 63-266001 | 11/1988 |
| JP | 4-247836 | 9/1992 |
| JP | 5-148615 | 6/1993 |
| JP | 6-280044 | 10/1994 |
| JP | 11-106948 | 4/1999 |
| JP | 2005-213560 | 8/2005 |
| JP | 2005-273011 | 10/2005 |
| JP | 2006-517612 | 7/2006 |
| JP | 2006-249462 | 9/2006 |

OTHER PUBLICATIONS

John J. Dunkley, "Atomization," ASM Handbook, vol. 7 (1998), pp. 35-52.*
Machine translation of JP2005-213560 (Japanese version published Aug. 11, 2005.*
Office Action mailed Sep. 25, 2012, in Japanese Patent Application No. 2008-132026, filed May 20, 2008 (with English-language translation).

* cited by examiner

*Primary Examiner* — Roy King
*Assistant Examiner* — Christopher Kessler
(74) *Attorney, Agent, or Firm* — Oblon, Spivak, McClelland, Maier & Neustadt, L.L.P.

(57) ABSTRACT

An object of the present invention is to provide an electrical discharge surface treatment-purpose electrode that stabilizes properties and a film-forming rate of a coating made by surface treatment that uses the electrode showing a narrow distribution in physical properties such as a composition and resistance. A method of manufacturing an electrical discharge surface treatment-purpose electrode according to the present invention is identified as a method of manufacturing an electrical discharge surface treatment-purpose electrode formed of a green compact made of a metal powder subjected to compression molding, characterized in that the method includes the step of forming a nitride coating by nitriding a surface of the metal powder, and the step of forming a green compact by subjecting the metal powder having its surface nitrided to compression molding.

10 Claims, 5 Drawing Sheets

METHOD OF MANUFACTURING ELECTRICAL DISCHARGE SURFACE TREATMENT-PURPOSE ELECTRODE AND ELECTRICAL DISCHARGE SURFACE TREATMENT-PURPOSE ELECTRODE

BACKGROUND OF THE INVENTION

1. Field of the Invention

The present invention relates to a method of manufacturing an electrode used for electrical discharge surface treatment (hereinafter also referred to as an electrical discharge surface treatment-purpose electrode). Further, the present invention relates to a coating formed by electrical discharge surface treatment (hereinafter also referred to as an electrical discharge surface treatment coating), which is formed with use of the relevant electrical discharge surface treatment-purpose electrode.

2. Description of the Background Art

As a method of surface treatment by electrical discharge machining (electrical discharge surface treatment), Japanese Patent Laying-Open No. 05-148615, discloses a method of electrical discharge surface treatment in which a green compact electrode made of fine particles of WC (tungsten carbide) and Co (cobalt) subjected to compression molding is used to form a coating layer having a thickness as large as several tens of millimeters at a surface of a work piece. The coating mainly composed of a carbide such as WC can easily be obtained by subjecting metal to electrical discharge treatment in oil, for example, and thereby allowing the metal to react with carbon in the oil to form the coating.

As a conventional method of manufacturing an electrical discharge surface treatment-purpose electrode to be used in electrical discharge surface treatment, there has been known a method of manufacturing an electrode by molding and heating a metal powder manufactured by a specific granulation method as shown in Japanese Patent Laying-Open No.2005-213560. Specifically, Japanese Patent Laying-Open No. 2005-213560, discloses a method of manufacturing a conductive electrode as follows. Fine metal particles having a mean particle size (diameter) of several tens of micrometers are initially mixed into an organic solvent such as acetone and pulverized with use of a vibration mill or the like to have a mean particle size of at most approximately 3 μm, to prepare a mixture in which the pulverized fine metal particles are dispersed in acetone. To the mixture, approximately 1-10% by mass of wax such as paraffin is added as a binder, to promote propagation of pressure caused by a press to the inside of the metal powder in the subsequent press working. A mixed material made of the above-described mixture and wax is then agitated and sufficiently mixed in a ball mill. Next, a drying device generally referred to as a spray dryer is used to spray the mixed material described above on an atmosphere in which nitrogen at a high temperature is circulated, so as to evaporate the organic solvent and dry the fine metal particles. During the drying, the mixed material is spherically granulated owing to its surface tension, resulting in powder particles having a size of 20 μm-40 μm. The obtained powder is molded by the press, and then heated in a vacuum furnace or in a furnace filled with a nitrogen atmosphere to manufacture the conductive electrode. In Japanese Patent Laying-Open No. 2005-213560,, the wax in the mixed material is molten and removed during the heating.

SUMMARY OF THE INVENTION

In recent years, there is an increasing demand for forming a metal coating having lubricity and corrosion resistance in a high-temperature environment, for example, by electrical discharge surface treatment. Further, there is a demand for applying a thick metal coating or alloy coating formed by electrical discharge surface treatment, so as to make repairs or dimensional corrections on a metal part.

The past experiments carried out by the inventors of the present invention have revealed that the key point in forming a metal coating or alloy coating by electrical discharge surface treatment is a composition and a structure of an electrode used for forming the coating at a surface of the work piece (work), and that a coating formed at the surface of the work cannot be uniform unless electrical discharge surface treatment is conducted with use of an electrode that shows a narrow distribution in composition and physical properties.

Further, for the purpose of reducing weight and improving heat resistance of a material for forming an electrode, there arises a need to use a metal powder superior in such physical properties but inferior in oxidation resistance, as the relevant material. In the case that such a metal powder is used as the material, oxidation of the metal powder proceeds in a localized manner in the electrode-manufacturing step, resulting in a problem of variations in electrical resistance value of the electrode from portion to portion.

With the application of the manufacturing method in Japanese Patent Laying-Open No. 2005-213560, oxidation of such a metal powder (fine particles) has been suppressed to a certain degree, when compared with the oxidation in the past manufacturing method. However, the manufacturing method disclosed in Japanese Patent Laying-Open No. 2005-213560, has a problem of a reaction caused between a surface of the metal powder and oxygen in the organic solvent when the metal powder is mixed and dispersed in the organic solvent, a problem of an oxide formed at the surface of the metal powder because of frictional heat caused during agitation by means of the ball mill, and other problems. A metal oxide generally has high electrical resistance, and hence when the oxide is formed, the electrode has various oxidized states in itself, which are distributed irregularly, causing variations in electrical resistance of the electrode.

Figure 1:
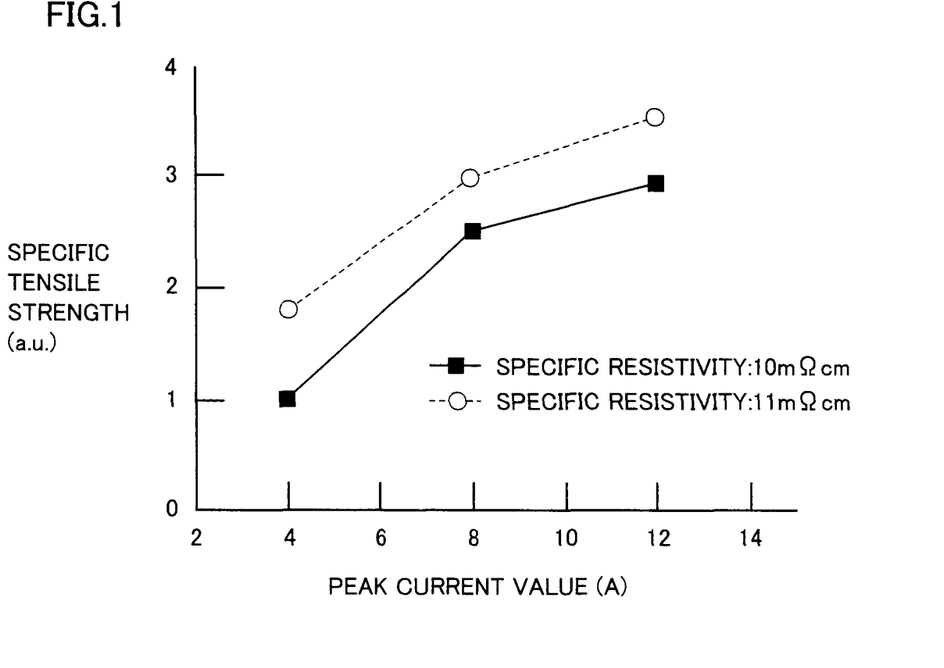
FIG. 1 is a graph that shows the relation between a peak current value and specific tensile strength.

FIG. 1 shows a tensile strength of electrical discharge surface treatment coatings, which were formed with use of electrodes exhibiting specific resistivities different by 10%, at various pulse current densities. FIG. 1 shows specific strength obtained when the tensile strength of a coating formed with use of an electrode exhibiting specific resistivity of 10 mΩcm and by application of a peak current of 4 A is set to be 1. Generally, increase in applied current causes larger specific tensile strength. The results in FIG. 1 show that a difference in specific resistivity by approximately 10% (1 mΩm) causes a difference in tensile strength by 20% to 70%. From these results, it is expected that variations in specific resistivity of an electrode, which are attributed to an oxidized state of the metal powder (fine particles), would have an influence on properties of a coating formed by electrical discharge surface machining with use of the electrode.

The present invention has been made in view of the above-described problems, and is identified as a method of manufacturing an electrical discharge surface treatment-purpose electrode formed of a green compact made of a metal powder subjected to compression molding, characterized in that the method includes the step of forming a nitride coating by nitriding a surface of the metal powder, and the step of forming the green compact by subjecting the metal powder having its surface nitrided to compression molding.

Further, the present invention relates to an electrical discharge surface treatment-purpose electrode formed of a green compact made of a metal powder subjected to compression molding, characterized in that a nitride coating is provided at a surface of the metal powder. Further, the present invention relates to a coating created with use of the above-described electrical discharge surface treatment-purpose electrode, and a turbine blade for a gas turbine engine, a blade for a steam turbine for electric power generation, and a heat exchanger, each having the relevant coating.

With the method of manufacturing an electrical discharge surface treatment-purpose electrode and the electrical discharge surface treatment-purpose electrode according to the present invention, a nitride coating is formed at the surface of the metal powder, so that oxidation of the electrical discharge surface treatment-purpose electrode can be prevented during the manufacturing process and after completion. Consequently, it is possible to easily manufacture an electrode that shows a narrow distribution in electrical resistance, and stabilize the properties of the coating formed by the electrical discharge surface treatment that uses the relevant electrical discharge surface treatment-purpose electrode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention will hereinafter be described in further detail. In the following description of the present invention, explanation is given with use of the drawings, and portions provided with the same reference characters in the drawings of the present application represent the same or corresponding portions.

Figure 2:
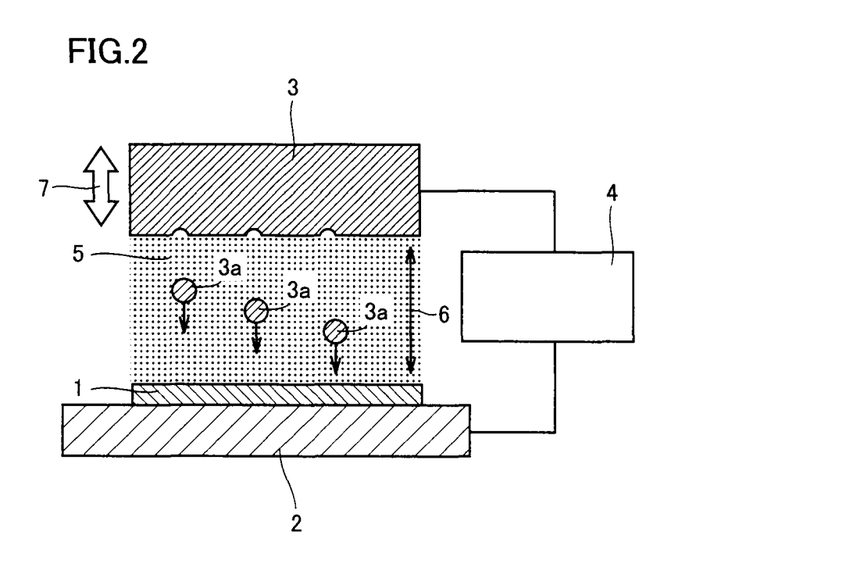
FIG. 2 is a diagram that schematically shows electrical discharge surface treatment.

Initially, with reference to FIG. 2, description will be made on the principle of electrical discharge surface treatment that uses an electrical discharge surface treatment-purpose electrode (hereinafter sometimes simply referred to as an electrode) formed of a green compact and manufactured by a manufacturing method according to the present invention. As shown in FIG. 2, in the electrical discharge surface treatment, a work 2 identified as a work piece and an electrical discharge surface treatment-purpose electrode 3 are disposed to face each other, as in the usual electrical discharge surface treatment. A dielectric region 5 in a gap 6 formed by work 2 and electrical discharge surface treatment-purpose electrode 3 is filled with insulating oil, water, or air. A desired voltage is applied by a power source 4 by allowing work 2 to serve as a positive electrode and allowing electrical discharge surface treatment-purpose electrode 3 to serve as a negative electrode, to cause pulsed electrical discharge. At this time, work 2 and electrical discharge surface treatment-purpose electrode 3 are kept in a state that the position of the electrode is adjusted by slightly moving the electrode upward and downward in accordance with the progress of machining, to avoid contact between the work and the electrode and achieve gap 6 suitable for causing an electrical discharge phenomenon, in other words, in a state that servo control 7 is provided along a main axis. When electrical discharge occurs, a part of electrical discharge surface treatment-purpose electrode 3 is fused with heat caused by the electrical discharge, and in the case that interparticle bonding force is weak, the fused part of electrical discharge surface treatment-purpose electrode 3 (electrode particles 3a, in FIG. 2) is separated owing to a blast or electrostatic force caused by the electrical discharge, and deposited at a surface of work 2, to form an electrical discharge surface treatment coating 1. In the present invention, the green compact refers to the one in which fine particles are packed under pressure and maintain the shape by means of physical attachment force.

The present invention is a method of manufacturing electrical discharge surface treatment-purpose electrode 3 used for the electrical discharge surface treatment as described above, and includes the step of forming a nitride coating by nitriding a surface of the metal powder (hereinafter referred to as a first step). As the metal powder in the first step, it is possible to present a metal powder formed of at least one metal selected from the group consisting of, for example, Ti (titanium), Cr (chromium), Zr (zirconium), Zn (zinc), Co (cobalt), and W (tungsten), or an alloy of at least two metals selected from the group consisting of, for example, Ti, Cr, Zr, Zn, Co, and W. In the case that the above-described metal powder is formed of these metals, an alloy thereof, or the like, the effects of the present invention as described above are exhibited prominently. In the case of an alloy made of the above-described metals, its compounding ratio is not particularly limited.

The metal powder described above is preferably fine particles having a mean particle size (diameter) of 20 μm to 50 μm, and more preferably a mean particle size of 20 μm to 25 μm. Using the metal powder having such a mean particle size is suitable for forming a nitride coating described below in a more homogeneous manner, and is preferable for increasing efficiency with which electrode particles 3a, are separated in the electrical discharge surface treatment and for being able to form electrical discharge surface treatment coating 1 as a dense film. Furthermore, in the case that the metal powder having such a mean particle size is used, electrical discharge surface treatment coating 1 to be formed can be a coating having, for example, peel strength between the substrate and the coating itself of approximately 80 MPa to 100 MPa, and a thickness of at least 100 μm. The thickness of electrical discharge surface treatment coating 1 may also be less than 100 μm. In such a film thickness, it is also possible to form a coating having, for example, peel strength between the substrate and the coating itself of approximately 50 MPa to 80 MPa.

Figure 3:
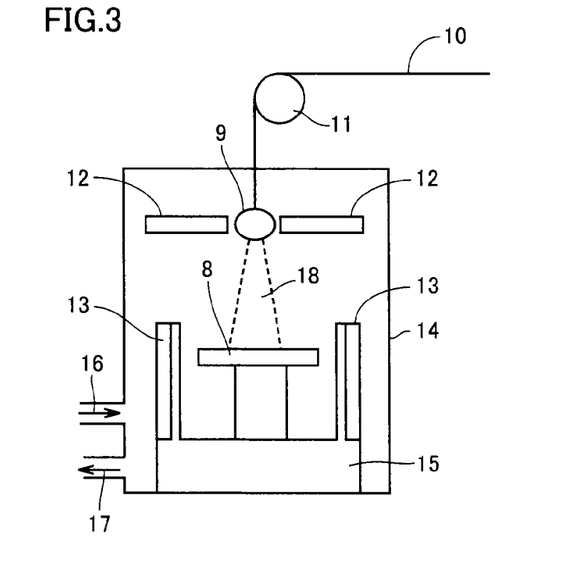
FIG. 3 is a schematic view that shows a step of manufacturing a metal powder.

The method of manufacturing the metal powder having the mean particle size as described above is not particularly limited. However, as shown in FIG. 3, the metal powder can be manufactured with use of a method in which a plasma atomizing method and a rotary disk process are combined. Description will hereinafter be made on a method of fabricating electrical discharge surface treatment-purpose electrode 3 by using Ti, which has a property of being easily oxidized. As shown in FIG. 3, a titanium wire 10 serving as a source material is introduced into a chamber 14 such that it is allowed to extend along a guide roller 11 as needed. Chamber 14 is vacuumized by a vacuum pump 17. Chamber 14 has a rotary disk 8 and a plasma torch 12 provided therein. When titanium wire 10 is fused by plasma torch 12, fused titanium wire 10 turns into fine particles having a diameter of 20 μm to 50 μm by surface tension. In the case that the metal powder (fine particles) formed of a metal or alloy other than titanium is to be manufactured, it is also possible to make fine particles having a diameter of 20 μm to 50 μm, as in the case of titanium, by adjusting plasma torch 12 to be under the condition allowing the metal wire to be fused.

To fuse titanium wire 10, surroundings of the plasma torch in chamber 14 described above is heated to be, for example, at least 3000° C. However, the temperature in chamber 14 is preferably lowered to approximately 500° C. immediately after the formation of fine metal powder particles is observed, so as to allow the metal powder fine particles to be rapidly cooled and solidified. In the case that rapid cooling and solidification are conducted, it is possible to form fine particles having high quality and showing a narrow distribution in particle size (diameter). For example, their particle size distribution (determined by a light scattering/diffraction method) can be approximately 20 μm to 70 μm. The condition for the rapid cooling and solidification described above depends upon a metal or alloy that forms the metal powder, and is preferably set to the condition of, for example, 100° C./second to 300° C./second. Further, by allowing the fine particles, which have been generated by being fused with use of plasma torch 12, to impinge upon a wall surface of a collector 15 provided around rotary disk 8, with the help of rotation of rotary disk 8, for pulverization, it is possible to obtain much finer metal powder (fine particles) having a size of approximately 1 μm to 10 μm. A series of activities for granulation are conducted in chamber 14 under vacuum, and hence an oxide coating is not formed at a surface of the obtained fine Ti particles.

In the case that the fine particles obtained by the above-described method have high reactivity with oxygen, an oxide coating is easily formed at their surface owing to contact with oxygen in the air or water. Therefore, the generated fine particles are preferably stored under vacuum so as not to allow them to be oxidized.

As the method of forming the nitride coating by nitriding a surface of the metal powder in the first step above, there are presented, for example, a method of allowing a nitrogen gas or an ammonia gas, as a nitriding gas 16, to flow into chamber 14 kept under vacuum and heating the nitriding gas in chamber 14 with use of a heater 13, an ion plating method, a CVD method, and a PVD method. The site where heater 13 is to be provided is not particularly limited, as long as it can heat the nitrogen gas in chamber 14 to a desired temperature.

In the case that a nitride coating is formed with use of a nitriding gas and through heating of the nitriding gas, it is possible to easily form a nitride coating at a surface of fine particles by, for example, heating the nitriding gas at 800° C. when Ti is used, and at 500° C. when Cr is used. The nitride coating is only required to have such a thickness as to be able to coat the surface of the fine particles and avoid contact with oxygen, and accordingly, the thickness thereof may be approximately 10 nm to 20 nm. If the nitride coating is excessively thick, cracks appear at the surface of the coating, so that oxidation tends to proceed in a localized manner, and that physical properties of the fine particles after the formation of the coating tend to be similar to those of titanium nitride. The thickness of the nitride coating to be formed can be adjusted by the time for heating treatment, and in the case that the thickness range described above is adopted, the time for heating treatment by a heater having power of approximately 3000 kW may be set to approximately 5 to 8 minutes. Further, the nitride coating may also be formed by plasma nitriding treatment in which plasma torch 12 is used in the nitriding gas atmosphere described above. When the plasma nitriding treatment was applied, a desired nitride coating was formed in time equal to or less than one half of the time required for the case of heating, namely, in approximately 2 minutes. The thickness of the above-described nitride coating can be measured with use of an Auger electron spectroscopy measurement device having, for example, a sputtering function.

Here, titanium is particularly described. Titanium oxide exhibits electrical resistance distribution ranging from electrical resistance of an insulator to electrical resistance of a semiconductor, whereas titanium nitride has conductivity. A surface of the formed fine titanium particles described above is coated with a nitride coating (TiN) stable against oxidation, and thus is not oxidized even in the subsequent process of manufacturing an electrode. Furthermore, the electrical discharge surface treatment-purpose electrode, which is fabricated with use of fine Ti particles having a nitride coating formed at their surface as such, is formed only of a conductor, so that it becomes an electrode having small electrical resistance and showing a narrow distribution in electrical resistance. With use of other metals, it is also possible to form an electrode having small electrical resistance and showing a narrow distribution in electrical resistance.

Figure 4:
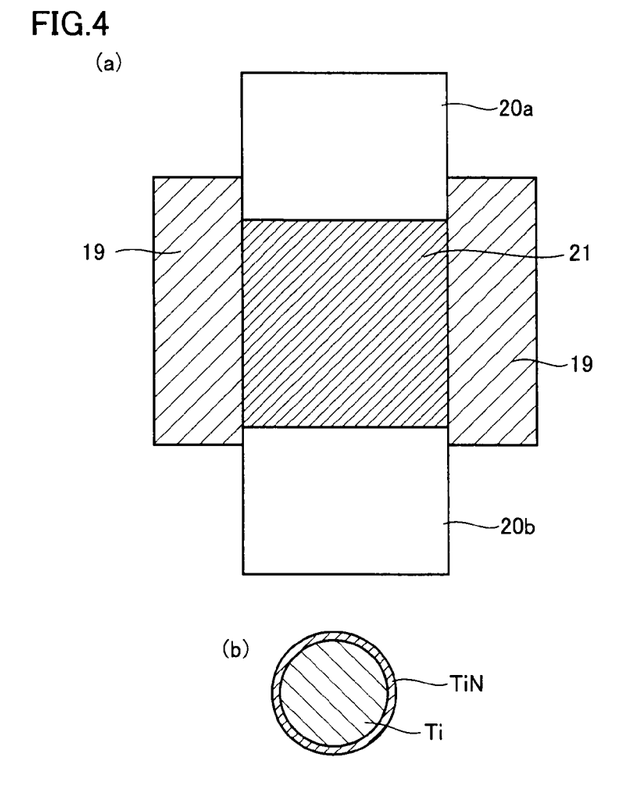
FIG. 4(a) is a schematic view that shows a step of manufacturing an electrical discharge surface treatment-purpose electrode.
FIG. 4(b) is a schematic view of a titanium powder having a nitride coating formed at its surface.

The manufacturing method according to the present invention includes the step of forming a green compact by subjecting the metal powder having its surface nitrided to compression molding (hereinafter referred to as a second step), after the first step described above. As shown in FIG. 4(a), in the second step, the fine Ti particles having a nitride coating formed at their surface (see FIG. 4(b)) are placed in a die 19 and compressed with punches (an upper punch 20a, and a lower punch 20b) in upward and downward directions to mold the fine Ti particles described above, resulting in a green compact 21. As a condition for the compression at this time, a pressing pressure of approximately 50 MPa may be adopted in a state that the fine Ti particles are allowed to fill the die in a volume ratio of approximately 40% to 65% with respect to the die. As described above, in the case that the metal powder (fine particles) is granulated by the plasma atomizing method, it is uniform in particle size, so that pressure distribution inside the green compact (molded body) during compression molding in the second step becomes relatively constant. Therefore, it becomes possible to mold a green compact without the need to disperse the fine particles in a nonaqueous solvent when they are molded, and to mold a green compact suitable for serving as an electrode even without using wax. In such a green compact, each of the fine particles exists as an independent particle, as in the state prior to compression.

After the compression molding in the second step described above, heating may also be conducted in a temperature range from 400° C. to 800° C. under a vacuum or inert gas atmosphere. The heating conducted after the compression molding can strengthen bonding among the fine particles, increase strength of the molded electrode, and reduce variations in specific resistivity of the electrode by an increased area of an interface of the fine particles and a stabilized composition.

With the steps described above, it is possible to manufacture an electrical discharge surface machining-purpose electrode formed of a green compact made of a metal powder having a nitride coating formed at its surface. The obtained electrical discharge surface machining-purpose electrode has a surface coated with a nitride coating, so that it is possible to prevent sudden heat generation and an ignition phenomenon that could be caused if fine metal particles having high activity and not having such a coating were brought into contact with air. Further, with the manufacturing method according to the present invention, it is possible to prevent oxidation of the electrical discharge surface treatment-purpose electrode during a manufacturing process and after completion, so that it is possible to easily manufacture an electrode showing a narrow distribution in electrical resistance, and stabilize properties of a coating formed at a work piece, which coating is formed by electrical discharge surface treatment that uses the relevant electrical discharge surface treatment-purpose electrode.

The coating fabricated with use of the electrical discharge surface treatment-purpose electrode according to the present invention has a dense composition, and thus is excellent in adhesion to the work piece and prevented from peeling. Further, the coating is excellent in corrosion resistance against various chemical agents and the like. In the conventional coating method such as a titanium plating method by PVD, for example, adhesion between the obtained coating and an underlayer (a surface of the work piece) is low, and thus peeling may occur. Therefore, it is difficult to form a thick film having a thickness of at least a few tens of micrometers, and having high adhesion to the underlayer. In contrast, the coating formed with use of the electrical discharge surface treatment-purpose electrode according to the present invention is excellent in adhesion to the underlayer, so that it is possible to form a thick coating having a thickness of, for example, at least 10 μm, at least 30 μm, and even at least 100 μm and at most 500 μm. The coating according to the present invention may also be formed to have a thickness of even at least 500 μm.

It is preferable that such a coating is provided at a surface of a turbine blade for a gas turbine engine, a blade for a steam turbine for electric power generation, or a heat exchanger.

For the turbine blade for a gas turbine engine and the blade for a steam turbine for electric power generation, a titanium alloy (e.g. Ti-6Al-4V of Japanese Industrial Standards (JIS) type 60) or the like is used as a material for forming these blades, so as to satisfy the condition of lightweight and high strength. However, a titanium alloy is disadvantageous because corrosion occurs owing to a sulfidizing gas and water vapor under a high-temperature condition, resulting in wastage and cracks at a blade tip. Therefore, by coating the blade tip with a titanium coating having high corrosion resistance, corrosion can be prevented.

For the heat exchanger, aluminum or copper is usually used as its constituent material, and in the case that the heat exchanger is to be exposed to a highly-corrosive environment (e.g. seawater at a high temperature, and the like), a heat exchanger that adopts titanium as a constituent material may be used. However, titanium is more expensive than aluminum and copper, and hence forming the whole heat exchanger out of titanium is difficult from the viewpoint of cost, except for the ones for a special purpose such for a nuclear power plant. Accordingly, there has been contemplated a method of coating a copper alloy with titanium in a heat exchanger. However, in the case that a titanium layer serving as a coating has cracks or defects, and seawater enters therethrough to reach the copper alloy serving as an underlayer, the copper alloy rapidly corrodes owing to a battery effect between the titanium and the copper alloy, and through-holes or cracks are generated at the heat exchanger, resulting in a problem of liquid leakage or the like. In contrast, in the case that the coating formed with use of the electrical discharge surface treatment-purpose electrode according to the present invention is provided at a surface of the heat exchanger, the coating layer has no cracks or defects because it has a dense composition, is excellent in corrosion resistance, and has favorable adhesion to the underlayer, and hence generation of through holes and cracks as described above can be prevented.

EXAMPLES

Although the present invention will hereinafter be described in further detail by providing examples, the present invention is not limited thereto.

Example 1

By the method shown in FIG. 3 in which a plasma atomizing method and a rotary disk process are combined, a titanium wire having a line width of 0.3 mm was molten by plasma torch 12 for granulation. At that time, rotary disk 8 was rotated at 100 krpm to manufacture fine titanium particles having a mean particle size of 20 μm. The fine particles were manufactured under vacuum.

While the obtained fine titanium particles were retained in chamber 14 set to be under a vacuum condition as shown in FIG. 3, nitrogen was introduced therein as a nitriding gas. Heater 13 was heated to 800° C. to thereby form a titanium nitride coating at a surface of the fine titanium particles (see FIG. 4(b)). An observation was conducted on the thickness of the coating on the obtained particles by means of an Auger electron spectroscopy measurement device having a sputtering function, showing that a nitride coating having a mean thickness of 20 nm was formed.

As shown in FIG. 4(a), the fine titanium particles having the nitride coating described above were allowed to fill die 19 in a volume ratio of 50% with respect to the die, and subjected to compression molding with the pressure of each of upper punch 20a and lower punch 20b, being set to be 50 MPa, to manufacture green compact 21. Next, green compact 21 was heated to 800° C. to obtain an electrical discharge surface machining-purpose electrode.

The electrical discharge surface machining-purpose electrode obtained by the above-described method was used to perform electrical discharge surface treatment under the following conditions, and the electrode was evaluated.

The electrical discharge surface treatment was conducted with use of the electrical discharge surface treatment device as shown in FIG. 2. To form electrical discharge surface treatment coating 1 at a surface of work 2, electrical discharge surface treatment-purpose electrode 3 obtained by the method described above and work 2 were disposed to face each other with water interposed therebetween, and pulsed electrical discharge was caused by power source 4 between electrical discharge surface treatment-purpose electrode 3 and work 2. With the energy of electrical discharge, a coating made of a material that forms electrical discharge surface treatment-purpose electrode 3 (i.e. electrical discharge surface treatment coating 1) was formed at a surface of work 2.

Figure 5:
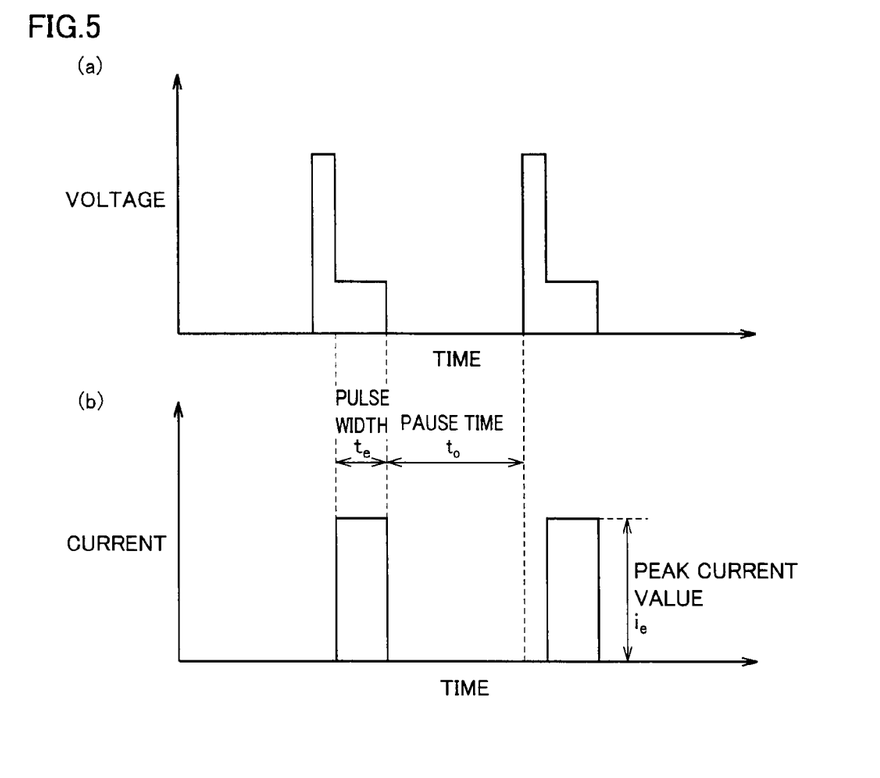
FIG. 5(a) is a graph that shows a voltage of the shape of an electrical discharge pulse according to a present embodiment with respect to time.
FIG. 5(b) is a graph that shows a current of the shape of an electrical discharge pulse according to the present embodiment with respect to time.

Electrical discharge surface treatment-purpose electrode 3 and work 2 were connected to power source 4 such that electrical discharge surface treatment-purpose electrode 3 has negative polarity and work 2 has positive polarity, so as to generate an electrical discharge ark column between electrical discharge surface treatment-purpose electrode 3 and work 2. Electrical discharge surface treatment coating 1 was formed with use of an electrical discharge pulse having waveforms as shown in FIG. 5(*a*) and FIG. 5(*b*), under the pulse conditions including a peak current value $i_e=10$ (A), electrical discharge duration (electrical discharge pulse width) $t_e=64$ (μs), pause time $t_o=128$ (μs), and treatment for 15 minutes with use of an electrode having an area of 15 mm×15 mm. The obtained electrical discharge surface treatment coating 1 was cut into cross-section, and its thickness was then measured under an optical microscope to be approximately 300 μm. During the electrical discharge machining, the state of the electrode and the progress of electrical discharge were also observed. A stable film-forming rate was maintained at all the positions on the electrical discharge surface treatment-purpose electrode, and localized electrical discharge or a short circuit were not observed, so that stable electrical discharge was caused. Furthermore, the formed coating had a uniform thickness across the entire machined surface, had adhesion strength to the substrate of 50 MPa to 100 MPa, and had favorable coating properties.

Figure 6:
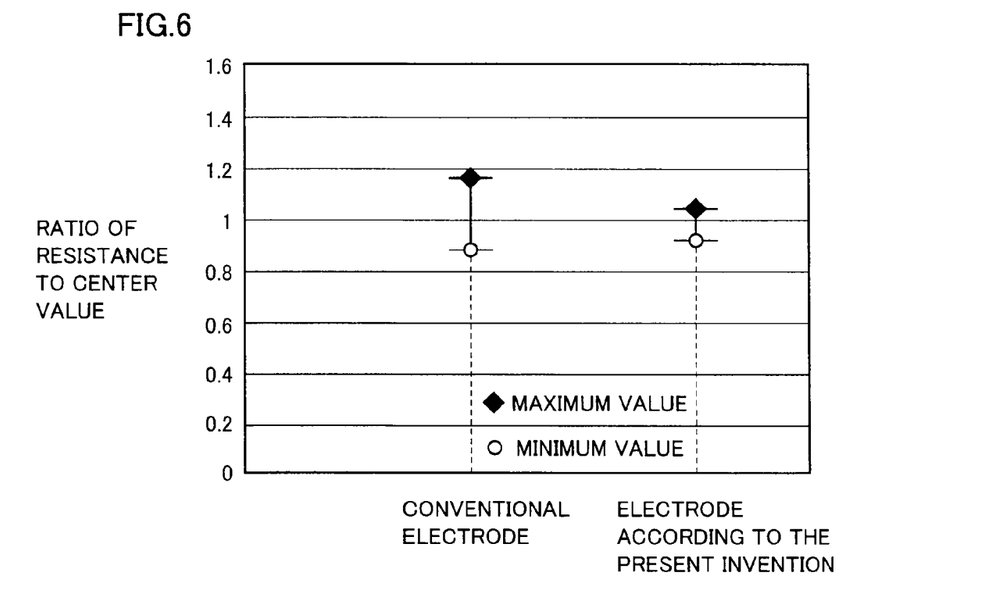
FIG. 6 is a diagram that shows the relation between an electrode and a specific resistivity value.

Regarding resistivity of the electrical discharge surface treatment-purpose electrode according to the present invention, FIG. 6 shows specific resistivity values with respect to a target (center) value, which is set to be 1. Specifically, 10 electrical discharge surface treatment-purpose electrodes were prototyped, and specific resistivity values of the respective electrodes were measured, and the maximum one and the minimum one were plotted in FIG. 6. Further, variations σ in specific resistivity value of the respective prototyped electrodes were measured to be 3.2%, as a ratio (%) of a standard deviation to a mean value.

Comparative Example 1

An electrical discharge surface treatment-purpose electrode was fabricated by the conventional method. Similarly as in Example 1, the obtained electrode was used to form electrical discharge surface treatment coating 1 having a thickness of 300 μm on work 2 by the electrical discharge surface treatment, and the electrode was evaluated.

The electrical discharge surface treatment-purpose electrode was fabricated in accordance with the method described in Japanese Patent Laying-Open No. 2005-213560. Specifically, a titanium powder having a mean particle size (diameter) of 100 μm was initially mixed into acetone. In the acetone solvent, the titanium powder was pulverized by means of a vibration mill to achieve a mean particle size of 5 μm, to prepare a mixture in which the titanium powder having a mean particle size of 5 μm was dispersed in acetone. To the mixture, approximately 7% by mass of paraffin was added as a binder. Subsequently, a mixed material made of the above-described mixture and binder was sufficiently agitated and mixed in a ball mill. Next, a drying device (spray dryer) was used to circulate nitrogen, and the mixed material described above was sprayed on the atmosphere set at 100° C. With this drying device, acetone was evaporated to dry the titanium powder. During the drying, the mixed material was spherically granulated, resulting in a powder having a mean particle size of 30 μm. The obtained powder was molded by the presses so as to take a shape similar to that of Example 1, and then heated in a vacuum furnace or a furnace filled with a nitrogen atmosphere to melt and remove the binder, so that a conductive electrode was manufactured.

An observation was conducted on the progress of the electrical discharge treatment with use of the electrical discharge surface treatment-purpose electrode obtained in Comparative Example 1, showing that there were variations in machining time and coating thickness, and that there was observed an unstable electrical discharge phenomenon such as short-circuit electrical discharge during the treatment. Moreover, as shown in FIG. 6, the width of the specific resistivity values between the maximum value and the minimum value is large, and variations σ, which were determined as a ratio (%) of a standard deviation to a mean value, were 9.2%.

The results in FIG. 6 show that the electrical discharge treatment with use of the electrical discharge surface treatment-purpose electrode according to the present invention can decrease the width of the specific resistivity values between the maximum value and the minimum value by 60%, when compared with that in Comparative Example 1. Further, variations σ were reduced by 70%.

Comparative Example 2

An electrical discharge surface treatment-purpose electrode was fabricated similarly as in Example 1, except that TiN particles having a mean particle size of 20 μm were used as a metal powder and that an additional nitride coating was not formed. The fabricated electrical discharge surface treatment-purpose electrode was evaluated by a method similar to that of Example 1. The results show that, in the electrical discharge treatment with use of the electrical discharge surface treatment-purpose electrode obtained in Comparative Example 2, adhesion strength to the substrate was at most 20 MPa, and hence physical properties of the electrode were inferior to those of the electrode obtained in the example. The reason is assumed to be that TiN identified as ceramic exhibits properties more brittle than those of Ti identified as metal, and that TiN has a melting point as high as approximately 3000° C. and hence is not sufficiently fused during the electrical discharge treatment, and a larger portion thereof is incorporated into the coating in the form of fine particles.

Example 2

As shown in Example 1, the electrical discharge surface treatment was conducted with a peak current value $i_e=10$ (A), an electrical discharge duration (electrical discharge pulse width) $t_e=64$ (μs), and pause time $t_o=128$, (μs), by allowing the electrode having an area of 10 mm×10 mm to scan on a substrate (100 mm×100 mm) made of a titanium 64 alloy, to form an electrical discharge surface treatment coating that was made of pure titanium and had a thickness of 100 μm, in a region of 50 mm×50 mm.

Comparative Example 3

For comparison with Example 2, a plating coating was formed on a substrate (100 mm×100 mm) formed of a titanium 64 alloy, by a plating method using PVD. In the plating method using PVD, an object to be plated was disposed in a chamber of a PVD device, the chamber was vacuumized, and then an argon gas was allowed to flow in a continuous manner at 20 sccm. DC magnetron sputtering was conducted at a power of DC 500 W. The sputtering was conducted for 120 minutes with use of pure titanium having a diameter of 6 inches, as a target, to form a plating coating having a thickness of 30 μm.

<Tensile Test>

Figure 7:
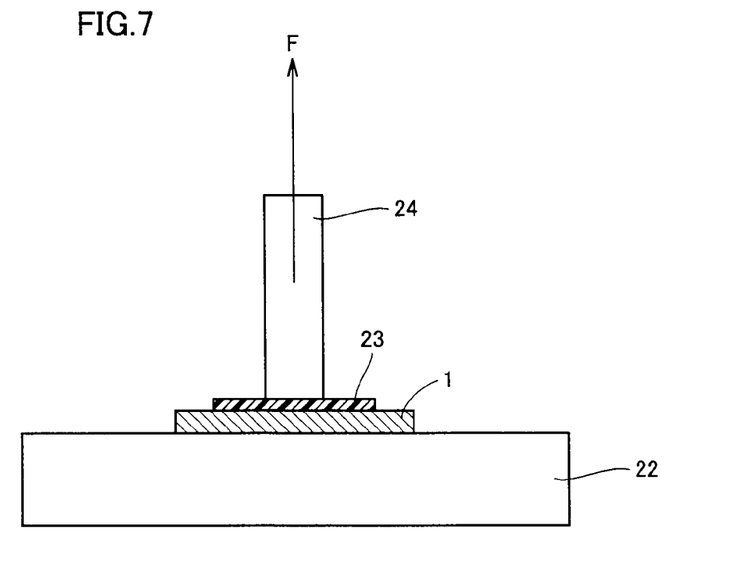
FIG. 7 is a schematic view of a universal tensile test.

On the coatings formed in Example 2, and Comparative Example 3, a tensile test was conducted (see FIG. 7). FIG. 7 is a schematic view of a universal tensile test. As shown in FIG. 7, an adhesive 23 made of a synthetic resin was applied to have a thickness of 30±5 μm, at a surface of coating 1 obtained in Example 2, which was formed on a titanium 64 alloy substrate 22. A stainless-steel tensile jig 24 having a diameter of 10 mm was bonded to a central portion of a surface of adhesive 23. Substrate 22 was fixed to a universal tensile test device (not shown), and a tensile load was applied to stainless-steel tensile jig 24 in the direction of an arrow F in FIG. 7. In evaluating Comparative Example 3, a similar test was conducted on coating 1, which was identified as a titanium plating coating.

The titanium plating film formed in Comparative Example 3 easily peeled by application of a tensile load of at most 1 MPa, whereas the coating formed by the electrical discharge surface treatment using titanium (hereinafter also referred to as titanium electrical discharge surface treatment) in Example 2 did not cause peeling or cracking even by the application of a tensile load of 20 MPa. The tensile strength of adhesive 23 that bonds stainless-steel tensile jig 24 to coating 1 was 20 MPa, and hence the tensile load equal to or larger than 20 MPa was not applied in the present test method. However, it is clear that even application of a tensile load equal to or larger than 20 MPa can produce favorable results. As such, it was shown that the coating formed by titanium electrical discharge surface treatment (hereinafter also referred to as titanium electrical discharge surface treatment coating) formed in the present invention has high adhesion to the underlayer and can implement a thick coating that is less likely to cause peeling and cracking, when compared with the conventional titanium plating film.

Example 3

As shown in Example 1, the electrical discharge surface treatment was conducted with a peak current value $i_e$=10 (A), an electrical discharge duration (electrical discharge pulse width) $t_e$=64 (μs), and pause time $t_o$=128 (μs), by allowing the electrode having an area of 15 mm×15 mm to scan on a turbine blade formed of a titanium 64 alloy, to form an electrical discharge surface treatment coating made of pure titanium and having a film thickness of 500 μm.

After the electrical discharge surface treatment coating was formed, its surface was ground with use of a grinder. The ultimate thickness of the titanium electrical discharge surface treatment coating was 300 μm.

Comparative Example 4

For comparison with Example 3, there was fabricated a turbine blade made of a titanium 64 alloy and having a titanium plating layer with a thickness of 20 μm formed at its surface. The conditions for the titanium plating were similar to those in Comparative Example 3.

<Evaluation of Wastage>

The two types of turbine blades manufactured in Example 3 and Comparative Example 4 were operated at a gas turbine engine at 1500° C. for 1000 hours, and then an amount of wastage of a tip portion of each of the turbine blades was measured with a three-dimensional laser profilometer. Table 1 shows the measurement results.

TABLE 1

| | Wastage Amount (μm) | |
|---|---|---|
| Operation Time (hr) | Example 3 (Titanium Electrical Discharge Surface Treatment Coating) | Comparative Example 4 (Titanium Plating) |
| 0 | 0 | 0 |
| 200 | 0.053 | 0.15 |
| 400 | 0.106 | 0.45 |
| 600 | 0.134 | 0.68 |
| 800 | 0.17 | 0.88 |
| 1000 | 0.2 | 1.004 |

Figure 8:
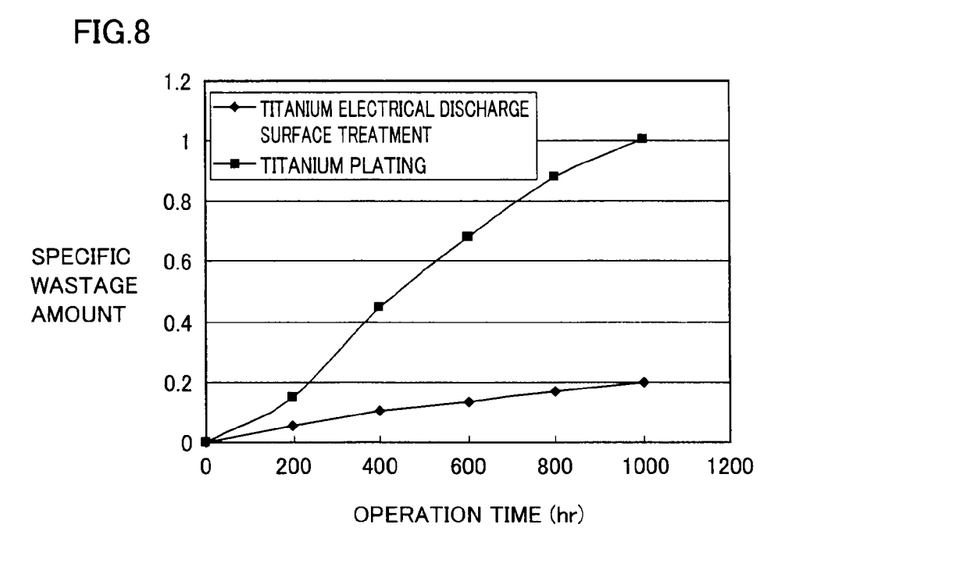
FIG. 8 is a diagram that shows operation time and a wastage amount.

FIG. 8 shows, with use of a ratio, a wastage amount at a tip of the turbine blade having the titanium electrical discharge surface treatment coating formed thereat, while a wastage amount of a tip of the turbine blade having the titanium plating film formed at its surface and operated at 1500° C. for 1000 hours was set to be 1 based on the results in Table 1. It was shown that a wastage amount of the tip of the turbine blade having the titanium electrical discharge surface treatment coating formed thereat is less than that of the tip of the turbine blade having the titanium plating coating formed thereat, by approximately 80%. In contrast, the titanium plating coating peeled after the operation of the gas turbine.

The results described above show that an SUS 304 turbine blade having an electrical discharge surface treatment coating formed at its surface with use of pure titanium can reduce an amount of corrosion under the high-temperature condition by 80%, when compared with the turbine blade having a titanium plating coating formed thereat.

Example 4

There was used a plate-type heat exchanger having a copper-plate surface at which a titanium electrical discharge treatment coating was formed to have a thickness of 300 μm. The forming condition includes a peak current value $i_e$=10 (A), an electrical discharge duration (electrical discharge pulse width) $t_e$=64 (μs), pause time $t_o$=128 (μs), and utilization of the electrode having an area of 50 mm×50 mm.

Figure 9:
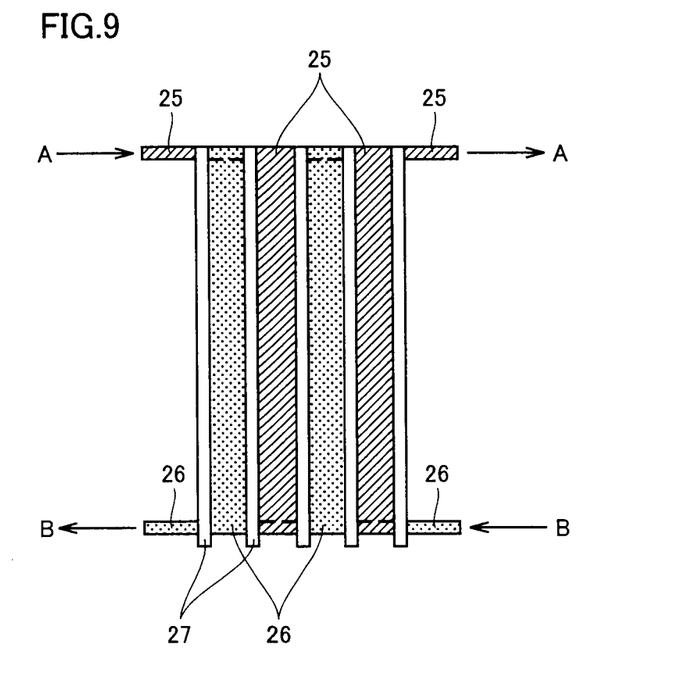
FIG. 9 is a schematic view of a plate-type heat exchanger.

FIG. 9 is a schematic view of a plate-type heat exchanger used in the present example. As shown in FIG. 9, the above-described coating was formed on a copper plate 27, and pure water at 70° C. serving as a high-temperature fluid 25 and seawater at 20° C. serving as a low-temperature fluid 26 were allowed to flow for conducting heat exchange continuously.

Comparative Example 5

For comparison with Example 4, a similar heat exchange test was conducted on a plate-type heat exchanger in which a titanium plating coating having a thickness of 20 μm was formed on copper plate 27.

<Results of Heat Exchange Test>

In the plate-type heat exchanger in the Comparative Example 5, in which a surface of the copper plate was coated with the titanium plating coating, a trouble occurred after 6 months from the start of operation. Specifically, a hole having a diameter of 0.5 mm was made by corrosion, so that the pure water and the seawater were mixed through the hole. In contrast, in the heat exchanger according to the present invention, which was coated with the titanium electrical discharge surface treatment coating, no hole was generated even after one year from the start of operation. This shows that the heat exchanger having a surface at which a coating was formed by the electrical discharge surface treatment according to the present invention exhibits product lifetime at least twice as long as that of the one having a titanium plating coating formed thereat.

In the present examples and comparative examples, description has been made on the case that titanium was used. However, by adopting the aspects of the present invention as described above, it is also possible to manufacture an electrical discharge surface treatment-purpose electrode having favorable electrical discharge properties, even with use of a metal having an easily-oxidized property, such as Cr (chromium), Zr (zirconium), Zn (zinc), Co (cobalt), or W (tungsten), or an alloy containing these metals. This is because even if the powder tends to be easily oxidized as described above, its surface is coated with a conductive nitride coating, and hence the powder can be used to form an electrode without being exposed to oxygen during an electrode manufacturing process.

At this time, the fine particles having a Ti surface coated with TiN were used to manufacture an electrical discharge surface treatment-purpose electrode, and thus a part of electrical discharge surface treatment coating 1 formed on work 2 may be formed of TiN. However, TiN has been known as a substance having high hardness than that of Ti, and excellent in corrosion resistance, non-sticking property, and abrasion resistance. Even in comparison with a pure Ti coating, it is assumed that hardness, corrosion resistance, and abrasion resistance are improved. Further, by adjusting a film thickness (a coating amount) of the nitride coating, it is possible to achieve desired physical properties.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing an electrical discharge surface treatment-purpose electrode formed of a green compact made of a metal powder subjected to compression molding, comprising the steps of:
    forming said metal powder by plasma atomizing a wire with a plasma torch;
    forming a nitride coating by nitriding a surface of said metal powder; and
    forming the green compact by subjecting the metal powder having its surface nitrided to compression molding.

2. The method of manufacturing the electrical discharge surface treatment-purpose electrode according to claim 1, wherein said metal powder nitrided in the step of forming said nitride coating is formed of at least one metal selected from the group consisting of titanium, chromium, zirconium, zinc, cobalt, and tungsten, or an alloy of at least two metals selected from the group consisting of titanium, chromium, zirconium, zinc, cobalt, and tungsten.

3. The method of manufacturing the electrical discharge surface treatment-purpose electrode according to claim 1, wherein said nitride coating formed in the step of forming said nitride coating has a thickness of at least 10 nm and at most 20 nm.

4. The method of manufacturing the electrical discharge surface treatment-purpose electrode according to claim 1, wherein the nitriding in the step of forming said nitride coating is conducted under a vacuum atmosphere.

5. The method of manufacturing the electrical discharge surface treatment-purpose electrode according to claim 1, wherein the nitriding in the step of forming said nitride coating is conducted by plasma nitriding.

6. The method of manufacturing the electrical discharge surface treatment-purpose electrode according to claim 5, wherein the plasma nitriding is performed with the plasma torch in a nitriding gas atmosphere.

7. The method of manufacturing the electrical discharge surface treatment-purpose electrode according to claim 5, wherein said forming said metal powder includes, after said plasma atomizing, allowing fine particles of said metal powder to impinge upon a surface of a collector provided around a rotary disk.

8. The method of manufacturing the electrical discharge surface treatment-purpose electrode according to claim 1, wherein, as a result of said metal powder being formed by plasma atomizing, said metal powder is uniform in particle size so that a pressure distribution of said green compact during said compression molding is relatively constant so that non-aqueous solvents and waxes are not utilized.

9. The method of manufacturing the electrical discharge surface treatment-purpose electrode according to claim 1, wherein each particle of said metal powder exists as an independent particle prior to and after said compression molding.

10. The method of manufacturing the electrical discharge surface treatment-purpose electrode according to claim 1, further comprising:
    forming the electrical discharge surface treatment-purpose electrode from the green compact, so that variations in specific resistivity thereof is within 3.2%, as a % ratio of a standard deviation to a mean value.

* * * * *